Jan. 29, 1974  J. E. SCHMIDT  3,788,900

AIR-DEPOLARIZED PRIMARY BATTERY

Filed July 17, 1972  4 Sheets-Sheet 1

United States Patent Office 3,788,900
Patented Jan. 29, 1974

3,788,900
AIR-DEPOLARIZED PRIMARY BATTERY
Jacob E. Schmidt, Little Falls, N.J., assignor to McGraw-Edison Company, Elgin, Ill.
Filed July 17, 1972, Ser. No. 272,299
Int. Cl. H01m 27/00
U.S. Cl. 136—86 A                    4 Claims

ABSTRACT OF THE DISCLOSURE

An air-depolarized battery of the zinc-anode, carbon-cathode and alkaline electrolyte type has a series of cavities leading from the top face of the carbon cathode to nearly the bottom thereof and a chimney system which produces a rapid transfer of oxygen from the outside atmosphere to the gas-electrolyte interface of the cathode resulting in a marked increase in current capacity of the battery. As a further feature, which may be employed independently or in combination with the chimney system above mentioned, wire coils are inserted in the cavities to obtain a low resistance connection of the cathode terminal to the lower active portions of the cathode whereby a still greater efficiency and current capacity is achieved.

---

An object of the invention is to provide an improved air-depolarized battery which has a markedly greater current capacity than that of conventional batteries.

Another object is to provide a chimney system leading from cavities in the carbon cathode to the outside atmosphere to obtain a draft due to the absorption of oxygen leaving a lighter remaining gas at the bottom of the chimney to maintain a relatively rapid flow of oxygen from the outside air to the active gas electrolyte interface of the cathode.

Another object is to provide an improved manifold and chimney system for the air-depolarized cathode which permits the battery to be operated in moist or wet ambient conditions.

Another object is to provide such improved air-depolarized battery wherein the carbon cathode is completely shielded and protected from the elements.

These and other objects and features of the invention will be apparent from the following description and the appended claims.

Figure 1:
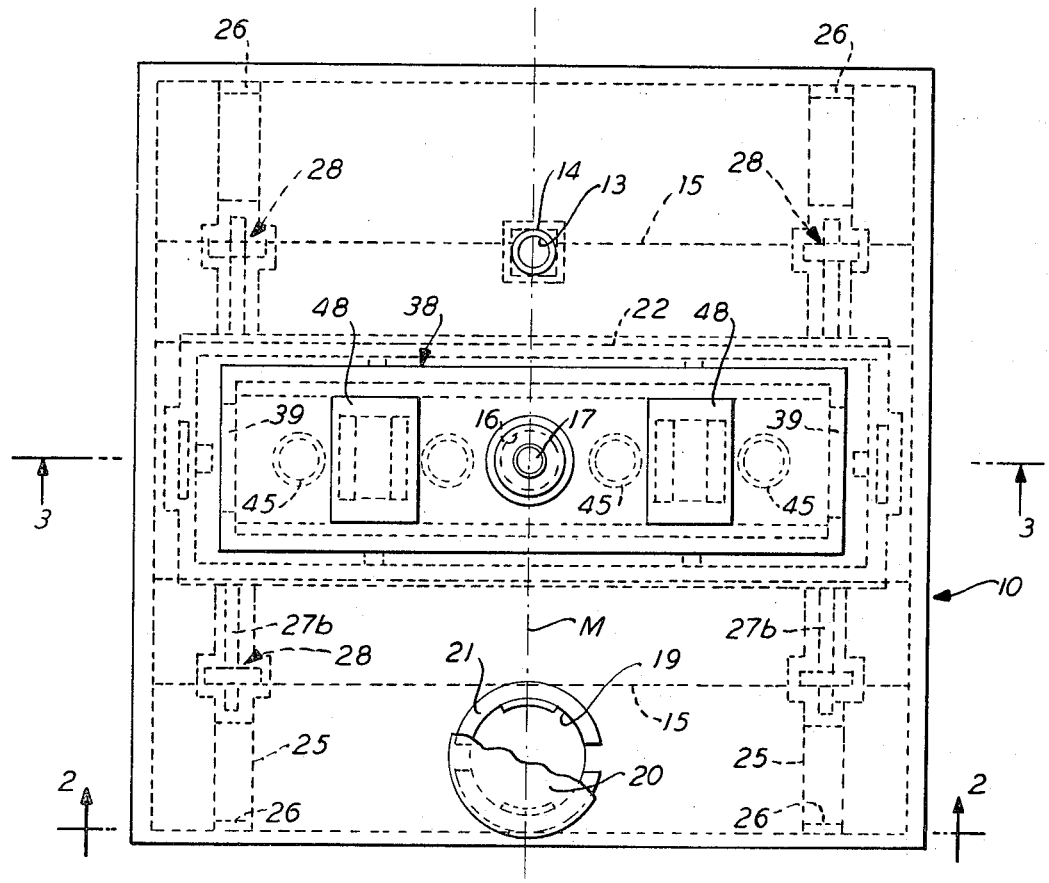
Figure 2:
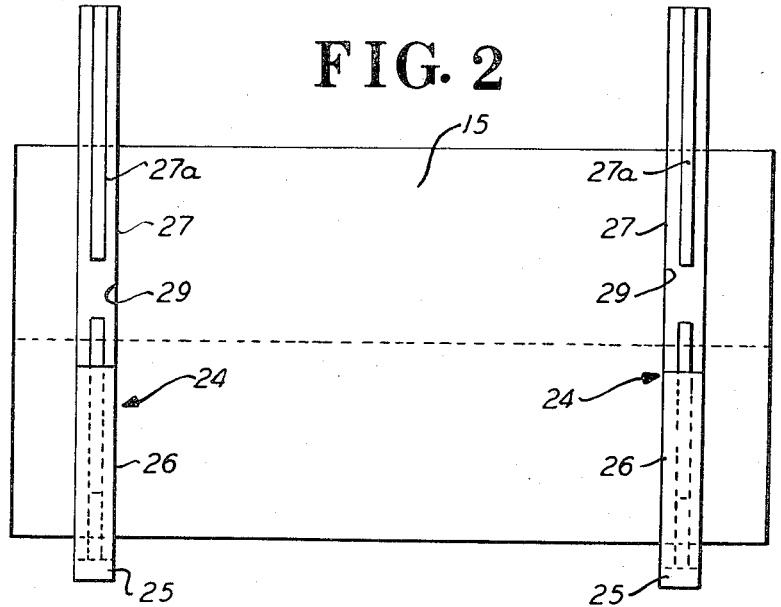
Figure 3:
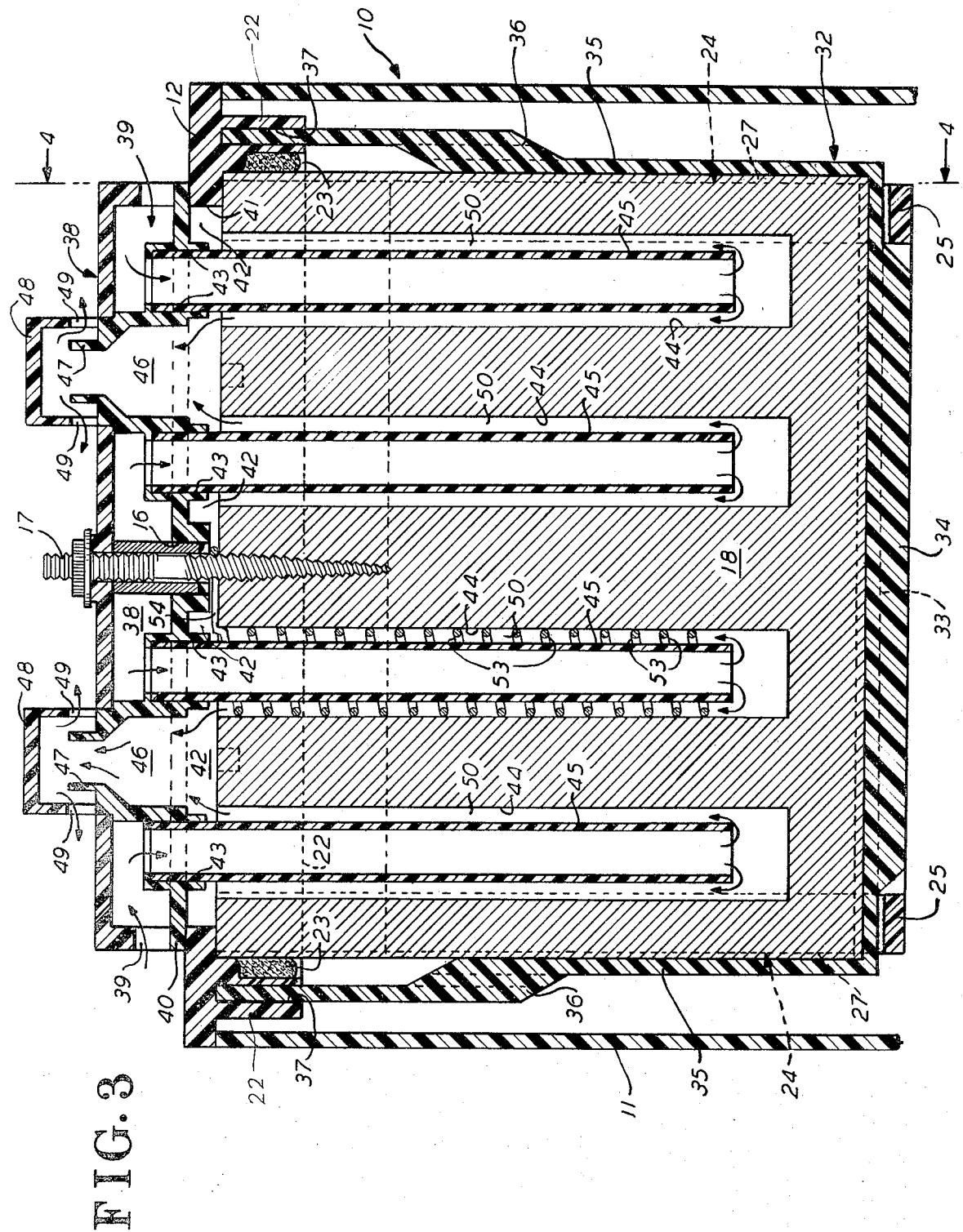
Figure 4:
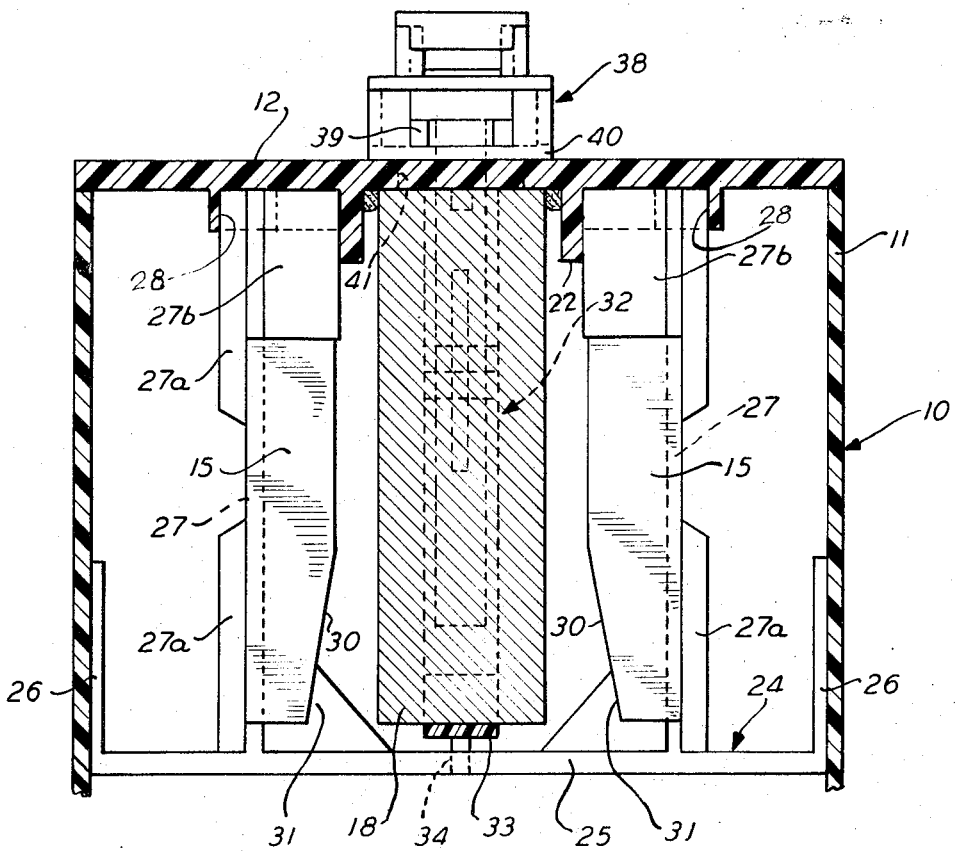
Figure 5:
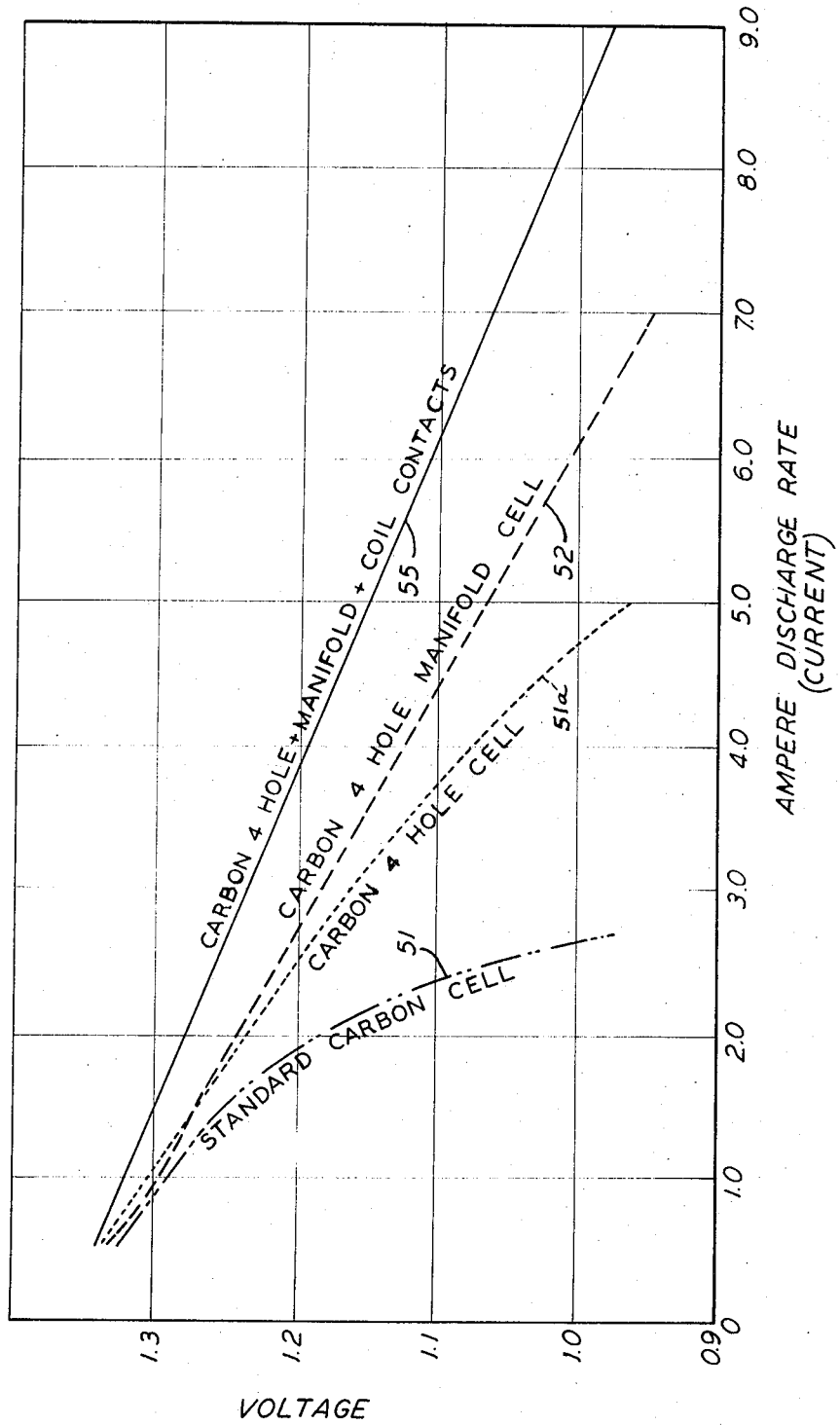

FIG. 1 is a top plan view of the battery;
FIG. 2 is a fractional elevational view from line 2—2 of FIG. 2 showing a side view of the supporting structure for the zinc anode;
FIG. 3 is a vertical sectional view taken from the line 3—3 of FIG. 1;
FIG. 4 is a vertical sectional view taken on line 4—4 of FIG. 3; and
FIG. 5 is a graph showing comparative voltage-discharge curves for the present battery and for the conventional corresponding battery.

The present battery has a rectangular case 10 as of acrylic plastic material comprising a lower rectangular container 11 and a cover 12 which is seated on and sealed to the rim of the container. The cover 12 has an opening 13 (FIG. 1) adjacent one end on a medial line M in which a terminal 14 is mounted for a pair of zinc anodes 15 located in opposite half portions of the case, a central opening 16 for a terminal 17 which is secured into a block-shaped carbon cathode 18, and a filler opening 19 on the medial line M adjacent the opposite side of the case, which is closed by a cap 20 having a bayonet coupling with a rim 21 of the opening.

Depending from a central portion of the cover is a rectangular flange 22 receiving the upper end of the carbon cathode 18 in abutment with the underside of the cover.

The carbon cathode has a loose fit within the flange 22 and is sealed by a sealing compound 23 which is flowed into the space between the upper portion of the cathode and the surrounding flange 22 (FIG. 3).

The pair of zinc anodes 15 are supported in parallel spaced relation at opposite sides of the cathode 18 by a pair of molded plastic support frames 24 preferably also of acrylic plastic which are bonded to and suspended from the cover 12. These frames extend crosswise of the zinc anodes as shown in FIGS. 1, 2 and 4. Each frame comprises a bottom strip 25 extending the width of the case and having upright locating arms 26 at the ends abutting against the opposite side walls of the case. About midway of each half portion of the bottom strip 25 there is a bar-shaped upright post 27 which has upper and lower reinforcing flanges 27a at its outer side and a wide centrally located flange 27b on the inner side of its upper portion (FIG. 4) giving this upper portion a cross-shape in plan view. This cross-shaped upper portion 27b fits into a cross-shaped slot 28 in the top cover 12 and is bonded thereto as by tetrahydrofuran to anchor each post of each frame 24 to the cover 12. Each zinc anode 15 is located at the inner side of the respective upright post 27 and has a flat outer side with slots 29 extending the full height of the anode which receives the respective bar-shaped portions of the posts. The lower half of each zinc anode is tapered at 30 to a decreasing width and is seated in the support frames 24 in a notched flange 31 at the corner between the respective posts 27 and the bottom strip 25. The top face of each zinc anode abuts against the bottom edge of the upper flange 27b to hold the zinc anode in place.

The carbon cathode block 18 is supported vertically in a frame 32 of molded construction also preferably of acrylic plastic material. This frame comprises a bottom strip 33 midway of the width of the cathode running the length thereof, which has a depending flange 34 therebetween (FIG. 3). The frame 32 has an upright arm 35 at each end which embraces the respective end wall of the cathode. Each arm 35 is offset outwardly at about two-thirds of its height, at 36 (FIG. 3) to engage a slot 37 in the outer wall of the flange 22 of the cover 12. The arms 35 are also bonded to the cover so that the cathode is likewise securely anchored to the cover 12.

Above the cover in vertical alignment with the top face of the cathode 18 is an air compartment 38 closed on all sides except for openings 39 in the opposite end walls thereof (FIG. 3). The bottom of the compartment is constituted by a plate 40 having its rim interposed between the side walls of the compartment and the cover 12 (FIG. 4) in sealed relation thereto. However, the cover 12 has a rectangular opening 41 of the same dimensions as the inside cross sectional area of the compartment 38 to provide an air compartment 42 (FIG. 3) over the top face of the cathode.

In the bottom wall 40 of the air compartment 38 there are two pairs of flanged openings 43 in a medial plane of the cathode 18 respectively at opposite sides of the central terminal 17, and directly in line with these openings are deep cylindrical cavities 44 in the cathode 18 that extend to nearly the bottom thereof. The flanged openings 43 receive respective tubes 45 as of plastic material in sealed relation to the flanges around the openings, which extend downwardly with clearance to nearly the bottom of each respective cavity 44. Between each pair of flanged openings 43 there is a chimney 46 which passes through the air compartment 38 in sealed relation to the walls of the compartment. Each chimney is open at the bottom to the air compartment 42 and is open at the top to the outside atmosphere. However, its upper opening is extended by a surrounding flange 47 and is covered by a hood 48 in spaced relation to the flange 47. This hood has openings 49 in the opposite side walls thereof which completes the opening of the chimney to the outside atmosphere. Thus, the outside air may pass to the bottom of each cavity 44 via the side openings 39, air compartment 38, and tubes 45, and from the bottom of the cavities via the annular space 50 between the tubes 45 and the walls of the cavities 44, air compartment 42 and chimneys 46.

In effect, the present novel construction has an extended chimney leading all the way from the bottom of each cavity 44 via the annular space 50 around each tube 45, compartment 42 and the chimney 46 to the outside atmosphere. This extended chimney provides a draft for drawing air continuously during operation of the battery from the outside atmosphere into the cavities via the side openings 39, air compartment 38, and tubes 45 to the bottom of the respective cavities. In the usual chimney action it is the differential temperature of the gases which provide the draft. In the present battery it is the absorption of the oxygen by the cathode from the air at the bottom of each cavity which leaves a larger percentage of lighter nitrogen in the remaining gas between the tube and the wall of the cavity that rises through the annular space 50 and chimney 46 to draw the air into the bottom of the cavities.

The rapid transfer of oxygen from the outside atmosphere to the gas electrolyte interface of the cathode accelerates its depolarizing action. This action occurs according to the formula

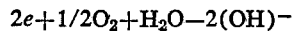

$$2e + 1/2 O_2 + H_2O - 2(OH)^-$$

The (OH) ions produced as a result of the active oxygen flows through the electrolyte to produce the battery current. The greater the gas electrolyte interface has access to oxygen the greater becomes the capacity of the battery. Extensive tests have shown that the present novel battery will produce as much as twice the current flow at the same voltage as that achieved by conventional air-depolarized batteries. In the graph of FIG. 5 the current voltage characteristics of two batteries each with a 4000 ampere hour rating is shown wherein the only difference between the batteries is that one has a conventional solid block cathode with its upper face exposed to the atmosphere and the other has the block with cavities and the chimney system herein-above described. The curve 51 shows the voltage current relationship for the conventional battery and the curve 52 for the present improved battery. In curve 51a the cathode has merely four holes.

As a further independent feature which however has also advantages in combination with the present chimney system wire coils 53 (one being shown by way of illustration) are inserted in each cavity of the cathode while in a tightened restricted condition and then released to engage the wall of the cavity from the bottom to near the top thereof on a helical line with a low resistance contact. The upper tail end 54 of each coil is led through the air chamber at the top of the cathode to the terminal 17. This reduces the electrical resistance from the lower active portions of the cathode to the cathode terminal which further increases the current capacity of the battery. In the solid block construction of the conventional cathode the current must flow through the whole mass of the cathode from each point of the interface to the terminal, but in this improved arrangement the current flows only short distances to make electrical contact with the wire coil 53 connected directly through low resistance connection to the battery terminal. This reduced resistance connection increases the current capacity of the battery by about 30% as is shown by curve 55 in the graph of FIG. 5.

The embodiments of my invention herein particularly shown and described are intended to be illustrative and not necessarily limitative of my invention, since the same is subject to changes and modifications without departure from the scope of my invention, which I endeavor to express according to the following claims.

I claim:

1. An air-depolarized primary battery comprising a container, an aqueous electrolyte solution in said container, an anode and a carbon cathode in said electrolyte solution, said cathode having a portion extending above said electrolyte solution and sealed along the peripheral surface thereof to said container, and said cathode having a plurality of cylindrical vertically-extending cavities leading from the bottom portion thereof through the top face thereof, a lid structure on said container having a bottom wall spaced above said cathode to provide a first compartment between the lid structure and the top face of said cathode and having a hollow upper structure with openings therein to provide a second air compartment above said bottom wall vented to the outside atmosphere, air tubes in said respective cavities open to the bottom portion of the cavities and extending upwardly through said bottom wall of said lid structure into said second air compartment to provide air paths from the outside atmosphere via said second air compartment and respective tubes to the bottom portions of said cavities, said tubes being smaller than said cavities leaving annular air space in the cavities open to said first air compartment, and a chimney leading through said lid structure from said first air compartment to provide air paths from the bottom portions of said cavities via said annular air spaces and first air compartment and chimney to the outside atmosphere whereby lighter gas remaining in said annular air spaces after oxygen is absorbed therefrom through the walls of said cavities will rise through said first air compartment and chimney to produce a gas circulation via said second air compartment and tubes into said cavities and maintain a supply of oxygen in said cathode for said battery.

2. The air-depolarized primary battery set forth in claim 1 wherein said second air compartment is vented via the side walls of said lid structure to the atmosphere and said chimney is open to the atmosphere above said lid structure.

3. The air-depolarized primary battery set forth in claim 1 including a chimney between each pair of adjacent cavities in said cathode.

4. The air-depolarized primary battery set forth in claim 1 including a conductive wire helix in each of said annular air spaces continuously engaging the walls of the respective cavities along the lengths thereof to lower the electrical resistance of the cathodes along said cavities.

References Cited
UNITED STATES PATENTS

| | | | |
|---|---|---|---|
| 2,097,077 | 10/1937 | Oppenheim | 136—86 A |
| 3,061,658 | 10/1962 | Blackmer | 136—86 R |
| 3,124,487 | 3/1964 | Duddy et al. | 136—86 R |
| 3,147,149 | 9/1964 | Postal | 136—86 R |
| 3,259,524 | 7/1966 | Fay et al. | 136—86 R |

DONALD L. WALTON, Primary Examiner

H. A. FEELEY, Assistant Examiner